United States Patent [19]
Pollio et al.

[11] 3,961,981

[45] June 8, 1976

[54] REFINING OF SUGAR CONTAINING LIQUIDS BY ION EXCHANGE

[75] Inventors: Frank Xavier Pollio, Union City, N.J.; Omar Campos, Campinas, Brazil

[73] Assignee: Rohm and Haas Company, Philadelphia, Pa.

[22] Filed: Aug. 22, 1974

[21] Appl. No.: 499,707

Related U.S. Application Data

[63] Continuation-in-part of Ser. No. 384,991, Aug. 2, 1973, abandoned, which is a continuation-in-part of Ser. No. 303,461, Nov. 3, 1972, abandoned.

[52] U.S. Cl. .......................... 127/46 A; 127/46 R; 127/48; 127/53; 210/24; 210/30 R

[51] Int. Cl.[2] ....................... C13D 3/14; B01J 1/04

[58] Field of Search ................. 127/46 R, 46 A, 48, 127/53

[56] References Cited

UNITED STATES PATENTS 3,073,725 1/1963 Popper et al. .................. 127/48 X 3,156,644 11/1964 Kunin ......................... 127/46 A X

*Primary Examiner*—Morris O. Wolk
*Assistant Examiner*—Roger F. Phillips

[57] ABSTRACT

A process for purifying sugar containing liquids or solutions, optionally at a sugar mill site, in which the hot sugar liquids are initially contacted with a weakly basic anion exchange resin in the bicabonate form, the salt impurities in the juices being converted to their corresponding bicarbonates, then passing the liquids under pressure through a cation exchange resin in the calcium form to remove alkali metals and then treating the resulting liquids pressure free to bring about the conversion of salts of hardness ions such as calcium bicarbonate in the liquid to insoluble calcium carbonate thereby giving a clarified, deionized and decolorized liquid product which is easily crystallized to a purified crystallized sugar product.

13 Claims, No Drawings

REFINING OF SUGAR CONTAINING LIQUIDS BY ION EXCHANGE

This application is a continuation-in-part of the co-pending U.S. application Ser. No. 384,991 filed Aug. 2, 1973, which in turn was a continuation-in-part of U.S. application Ser. No. 303,461 filed Nov. 3, 1972, both prior applications now abandoned.

This invention concerns a process for purifying sugar containing liquids or solutions. The term "purifying" is understood to include removal of color or color bodies as well as the removal of ions.

More particularly, this invention relates to a process for obtaining purified or decolorized and deionized sugar liquids by means of ion exchange, but without many of the disadvantages indigenous to conventional ion exchange sugar purification processes, for example, expensive cooling of hot liquids to prevent sugar inversion and high costs of resin regeneration with acids and problems of waste disposal.

Still more particularly, this invention involves an ion exchange process for purifying sugar liquids which eliminates the use of acid regenerants, or cation exchange resins operated in the hydrogen form (H+), which are responsible for high rates of sugar inversion.

The novel process is entirely suitable for integration into conventional sugar mill and/or refinery operations, without requiring any new or special equipment. In fact, it makes it possible to eliminate the use of existing steps and corresponding equipment in conventional sugar processing operations, and it also makes possible the production of a refinery grade sugar at a mill site by elimination of one or more conventional refinery steps.

The process of the invention may suitably be utilized for the treatment of any sugar containing liquids or solutions. Preferred liquids are thin raw sugar juices and the partially processed thicker liquors or syrups.

Generally the novel process may be carried out by first passing, for example, a hot raw sugar juice (which optionally may have been previously lime-defecated) through a weakly basic anion exchange resin which is in the bicarbonate form, then under pressure treating the thus carbonated juice with a cation exchange resin in the calcium form, and then heating under atmospheric or reduced pressure the resulting juice containing now essentially calcium bicarbonate salts to thereby convert the calcium bicarbonate to insoluble calcium carbonate, $CO_2$ and a clarified juice. The precipitation of the calcium carbonate also brings about further color removal or reduction. The clarified juice is then separated from the calcium carbonate by conventional means, optionally subjected to a further decolorization treatment, evaporated and crystallized to provide a purified, high quality sugar. Although the deashing stage preferably comprises heating the solution containing the soluble calcium bicarbonate to form insoluble calcium carbonate precipitate, an alternative embodiment to such thermal deashing would be to utilize a lime treatment step, liming being well known in the art for reducing hardness in aqueous solution. A schematic diagram showing a general outline or flow sheet of the novel process (except for regeneration steps discussed hereinafter), as well as a description of the reactions understood to be taking place, is given below:

Carbonation Step (I)

$$RNH{\cdot}HCO_3 + \begin{bmatrix} NaCl \\ CaSO_4 \\ \\ K_3PO_4 \\ MgCO_3 \end{bmatrix} \rightarrow RNH \begin{Bmatrix} Cl^{-1} \\ SO_4^{-2} \\ \\ PO_4^{-3} \\ CO_3^{-2} \end{Bmatrix} + \begin{bmatrix} NaHCO_3 \\ Ca(HCO_3)_2 \\ \\ KHCO_3 \\ Mg(HCO_3)_2 \end{bmatrix}_J$$

Calcification Step (II)

$$(RSO_3)_2\,Ca + \begin{bmatrix} NaHCO_3 \\ Ca(HCO_3)_2 \\ \\ KHCO_3 \\ Mg(HCO_3)_2 \end{bmatrix}_J \rightarrow RSO_3 \begin{Bmatrix} Na^{+1} \\ K^{+1} \\ Mg^{+2} \end{Bmatrix} + [Ca(HCO_3)_2]$$

Deashing Step (III)

$$[Ca(HCO_3)_2]_J \xrightarrow{(heat)} CaCO_3\downarrow + CO_2\uparrow + \text{purified juice}$$

$$[Ca(HCO_3)_2]_J + Ca(OH)_2 \rightarrow CaCO_3\downarrow + H_2O + \text{purified juice}$$

Code:
R = exchange resin backbone;
J = juice
(The equations above are illustrative only and not necessarily chemically balanced.)

The three essential steps or stages are, as shown above, the carbonation step or stage, the calcification step or stage and the deashing step or stage. While the above reactions indicate the presence of magnesium as one of the two hardness ions (the other being calcium) in the raw sugar juice, the magnesium is almost always present in very minor amounts, usually about 10–20% or less of the total hardness in the raw sugar juice. In stage (II), some of the magnesium, if present, might be present in the bicarbonate form in the juice (on the right-hand side of the equation); this would be precipitated as the insoluble hydroxide of magnesium in the deashing stage.

It should be noted that the second stage of the invention is performed under pressures ranging from 2 to 10 atmospheres, preferably 3 to 6 atmospheres. This pressure is required to prevent premature formation of insoluble calcium carbonate which disadvantageously might result in internal fouling of the resin beads and/or mechanical bed fouling. A preferred embodiment would perform the first stage under pressure also to improve the capacity of the anion exchange resin.

When ammonia solutions are used to regenerate the weak base resins, the waste regenerant will contain ammonium salts such as $NH_4Cl$, $NH_4(SO_4)_2$ etc. Through addition of lime to the waste regenerant, ammonium hydroxide is generated which can be used for regenerating of the weak base resin in subsequent regeneration cycles. Likewise, during a thermal deashing step the carbon dioxide generated can be recovered and utilized to convert the weak base resin to the bicarbonate form. Another important economical feature of the process concerns the utilization of the waste regenerant from the calcification step. When the strong acid resin is regenerated with aqueous $CaCl_2$ or other calcium salt solutions to convert the resin to the calcium form, a waste regenerant such as sodium chloride and potassium chloride is obtained. This waste can be used to partially decolorize the weak base resin prior to its regeneration with alkali or, alternatively, the waste regenerate can be utilized for regenerating the strong anion exchange decolorizing resins. Through reutilization of the chemicals contained in the waste regenerants, economies are realized and potential pollution and disposal problems are minimized. The process allows for maximum utilization of regenerants through re-use of waste regenerants and recovery of useful regenerant materials from these wastes.

In accordance with the present invention and in more detail, a raw defecated cane juice of about 13 Brix (obtained after a conventional lime defecation preliminary step) is first passed optionally under pressure through a weak base anion exchange resin operated in the bicarbonate form or cycle at about up to 50°C. (The basic concept of using a weakly basic anion exchange resin in the bicarbonate form for general water treatment and for other purposes is disclosed in U.S. Pat. No. 3,156,644, the disclosure of which is incorporated herein by reference.) In this stage, generally referred to as the carbonation stage, the inorganic anions, including such anions as chloride, sulfate, and phosphate are exchanged with bicarbonate ions. In this manner the chloride, sulfate, and phosphate ions are removed by the weak base resin and the bicarbonate ions are released to the juice. The treatment with the weakly basic anion exchange resin at the same time decolorizes the raw juices to the extent of about 50 – 80%.

Preferably, the raw defecated juices or liquors being treated in the carbonation stage will have a concentration of about 8 – 25 Brix, with 10–20 Brix being a more preferred concentration range. However, higher Brix concentrations of juices or liquors may also be used. The temperature in the first carbonation stage can vary, over a fairly wide range, but will ordinarily be in the range of about 40° – 65°C. The weakly basic anion exchange resin which may be employed in the carbonation stage are commercially available. They may be prepared, for example, by following the teachings of U.S. Pat. Nos. 2,591,574 or 2,675,359.

The juices after leaving the carbonation stage are passed directly into a unit containing a strong acid cation exchange resin operated in the calcium form or calcium cycle, for example, at a temperature of about 50°C. and at about 3 to 6 atmospheric pressures. In this manner, non-calcium cations (such as sodium and/or potassium) are exchanged for calcium and a juice containing dissolved or dispersed calcium bicarbonate ash results. The above reaction or exchange is highly unexpected and quite novel and it results in very effective removal of the melassegenic ions such as sodium and/or potassium from the sugar juices. Ordinarily, it would be thought that a cation exchange resin operated in the calcium cycle or calcium form would not remove sodium or potassium ions since a cation exchange resin has a greater affinity for divalent ions, such as calcium, than it does for monovalent ions, such as sodium or potassium. However, in the presence of raw sugar juice the above exchange takes place readily. Without limiting this invention to any particular theory or mode of operation, it is thought that the sugar juice acts as a chelating or sequestering agent for the calcium ions and thus promotes the exchange of the sodium and potassium ions for the calcium of the cation exchange resin. This stage, involving the use of the cation exchange resin in the calcium form, is referred to as the calcification stage and is generally carried out at a temperature in the range of about 40° – 65°C. and at about 3 to 6 atmospheric pressures. The strong acid cation exchange resin is preferably a sulfonic acid resin such as a sulfonated styrene-divinylbenzene copolymer. This class of cation exchange resins is well known and is readily commercially available.

The effluent juice from the calcification stage now containing the various bicarbonate salts, and especially calcium bicarbonate, is then subjected to a thermal or liming deashing stage. In the case of thermal deashing, heating to a temperature in the range of about 70° – 100°C., more preferably about 90° – 100°C., brings about maximum conversion of calcium bicarbonate to insoluble calcium carbonate. Obviously if thermal deashing is carried out at reduced pressures the deashing operating temperature will be much less. Precipitation or deposition of calcium carbonate results in a corresponding reduction in ash content. A theoretical 40–50 ppm total ash content (as $CaCO_3$) in the juice can be achieved in this state, assuming the carbonation and calcification stages are operated at maximum conversion. (The 40–50 ppm $CaCO_3$ remaining in the juices after deashing corresponds to the solubility of $CaCO_3$ in aqueous media.) If desired, the carbonation and calcification stages can be operated below maximum conversion should a higher ash level be desired in the juices to achieve some buffering action as a precaution against possible inversion. During the deashing stage any magnesium bicarbonate salts present may also be precipitated in the form of an insoluble precipitant such as magnesium hydroxide.

The juice from the deashing operation is subsequently clarified using conventional methods familiar to both sugar mills and refineries. The consistency of the $CaCO_3$ sludge is generally sufficiently coarse that the juices may be clarified and/or filtered using simple clarification and/or filtration techniques. The clarified juice (or filtered juice) is next evaporated to produce a 50–70 Brix clarified liquor.

The 50–70 Brix clarified liquor is then optionally subjected to a final decolorizing procedure involving a gross decolorization and polishing stage prior to final evaporation and crystallization. In this procedure, the clarified liquor from the deashing stage is passed through one or more strong base anion exchange resins operated in the chloride form or chloride cycle. This removes the remainder of any color and typically takes place at a temperature of about 70°–80°C. Preferably, the clarified liquor is first passed through a strong base, macroreticular anion exchange resin having quaternary ammonium functionality in the chloride form and having an acrylic backbone. Final removal of color bodies can be obtained by further treatment with another strong base, macroreticular, anion exchange resin having a styrene-divinylbenzene matrix operated also in the chloride form.

The clarified and decolorized liquors are then evaporated and crystallized to produce a high grade, refined and purified sugar.

In the Examples and throughout the specification and claims, all parts and percentages are by weight unless otherwise stated.

EXAMPLE I

A low Brix (about 13 Brix), lime-defecated, clarified raw cane juice having the analysis given below is passed at a temperature of about 50°C. through a one-inch glass column containing 200 ml of a weak base anion exchange resin I previously converted to the bicarbonate form. A total of 20 bed volumes (BV) of effluent juice are collected after discarding the first two BV of liquid displaced from the column and equipment.

Analysis of Clarified Raw Juice

| | Juice A |
|---|---|
| pH | 6.4 |
| Specific resistance, ohm cm | 240 |
| Alkalinity (pH = 4.0), ppm as $CaCO_3$ | 1150 |
| Approximate dissolved solids, ppm as $CaCO_3$ | 3300 |
| $Na^+$, " | 679 |
| $K^+$, " | 1685 |
| $Ca^{2+}$, " | 880 |
| $Mg^{2+}$, " | 50 |
| Brix, % | 13 |

Five effluent samples consisting of four-BV fractions are collected and evaluated. Results are listed below: (average properties or characteristics for each bed volume fraction are shown).

Resin I is prepared in accordance with the synthesis Example I of U.S. Pat. No. 2,675,359. Resin II is prepared in accordance with the synthesis Example I of U.S. Pat. No. 2,635,061 and contains 10.5% divinylbenzene as crosslinker.

| Effluent BV | Resin I ($HCO_3$—) Treatment pH | Sp.Resist. ohm cm | Alkalinity (pH= 4.0),ppm as $CaCO_3$ | Decolorization, % color removed |
|---|---|---|---|---|
| Influent | 6.40 | 240 | 1150 | — |
| 1–4 | 8.30 | 230 | 3500 | 80 |
| 5–8 | 7.45 | 220 | 3330 | 70 |
| 9–12 | 7.35 | 190 | 3150 | 60 |
| 13–16 | 7.40 | 190 | 2850 | 60 |
| 17–20 | 7.50 | 180 | 2650 | 60 |

The weak base effluent portions are combined and then passed at a temperature of about 50°C. through a one-inch column containing 200 ml of a sulfonated or sulfonic strong acid cation exchange resin II previously converted to the calcium form using a 4% aqueous solution of calcium chloride. After passage of the weak base effluent (from the carbonation stage) through the cation exchange resin in the calcium form at a 0.5 gal/ft$^3$/min flow rate, a 10.2 Kilograins (as $CaCO_3$)-/cu.ft. capacity is found (for the cation exchange resin). The exchange of the cations such as sodium, potassium, etc., which are present in the juice, for calcium results in the formation of calcium bicarbonate. The effluent from the cation exchange unit is next passed to an open heated vessel and the juices are then heated to about 90°–100°C. to bring about maximum conversion of calcium bicarbonate (and any magnesium bicarbonate) to calcium carbonate (and any magnesium hydroxide). After filtration to remove the precipitated salts or materials, the clarified juice is analyzed and found to have the following ionic composition:

pH = 7.1
potassium = 5 ppm (as $CaCO_3$)
sodium = 28 ppm (as $CaCO_3$)
hardness (i.e. calcium and/or magnesium = 91 ppm(as $CaCO_3$)
alkalinity = 20 ppm (as $CaCO_3$)

The combined carbonation, calcification, and heat treatments reduced the inorganic ash content of the juice from 3300 ppm to a value of approximately 124 ppm. The juices are subsequently evaporated to produce a 60 Brix liquor which is then passed through a two bed decolorization resin system consisting of decolorization resin A and decolorization resin B. By means of this treatment the 60 Brix liquor is further decolorized to the extent of 80–90%. In absolute color units, the influent 60 Brix liquor had a color of 4 Stammer units while the effluent from decolorization resin B has an average color of 0.5–0.7 Stammer units. When sugar is crystallized from this highly decolorized liquor a sugar of very high quality is obtained. Resin A, above-noted, is a macroreticular strong base, quaternary ammonium, anion exchange resin having an acrylic matrix; Resin B, above-noted, is a macroreticular strong base, quaternary ammonium, anion exchange resin having a styrene-divinylbenzene crosslinked matrix. The preceding example was run at pressures between 3 and 4 atmospheres.

Additional features and/or advantages of the present invention are:

1. Regeneration of the weak base resin can be achieved using aqueous sodium hydroxide or ammonia solutions applied at about 15°–60°C., followed by carbonation of the resin using water saturated with carbon dioxide.

2. Regeneration of the strong acid cation exchange resin is achieved using a soluble calcium salt, or using a lime slurry. If a lime slurry is used, the waste regenerant which will contain predominantly alkali metal hydroxides can be used to regenerate the weak base resin prior to carbonation with water saturated with carbon dioxide which converts the weak base resin to the bicarbonate form. The regenerating materials noted above are inexpensive and quite easy to handle.

3. The decolorizing strong base anion exchange resins are easily regenerated with aqueous salt solutions. A portion of the waste regenerants from these units may in turn be passed through the weak base resins prior to regeneration with the aqueous basic solutions and carbonated water. Use of the waste regenerants in this manner will result in partial elution of organic matter from the weak base resin prior to its regeneration with the aqueous basic solutions and carbonated water.

4. The process of this invention eliminates the need to use acidic regenerants and as a consequence acid resistant equipment is not needed and the possibility of any significant sugar inversion is also eliminated.

5. The novel process can be conducted at or near the customary temperatures currently used at sugar mills, factories and refineries and no danger of sugar inversion.

6. The process can be operated continuously and is applicable to processing of cane, beet, pineapple or other readily available juices, syrups and liquors.

While the invention disclosed above has principally referred to use of a cation exchange resin in the calcium form, and while optimum results are achieved with the calcium form of the cation exchange resin, the process is also operable with other alkaline earth forms or salts of the cation exchange resin, such as the barium form or the magnesium form. Also, while the weak base resin and strong acid resin which are referred to in the Example are macroreticular type in character, the invention is also operable with the gel form of these resins.

In an alternative embodiment of the invention, the cation exchange operation, i.e., the calcification stage, may be switched with the carbonation step, i.e., the cation exchange operation may be placed ahead of or before the weak base, anion exchange, carbonation step.

What is claimed is:

1. In a process for decolorizing and deionizing a sugar containing liquid in which the liquid is passed through a bed of a weakly basic anion exchange resin in the bicarbonate form, so as to convert the salts present in the solution to their corresponding bicarbonates and to remove a large portion of the color bodies present therein, the improvement which comprises contacting the liquid containing the bicarbonate salts under pressure of 2 to 10 atmospheres with a strong acid sulfonic cation exchange resin in the calcium form thereby exchanging the non-calcium metal cations in the liquid with the calcium from the resin, and then deashing the liquid by converting the soluble calcium bicarbonate to form an insoluble, predominantly calcium carbonate precipitate, and then separating the clarified and decolorized sugar solution.

2. A process according to claim 1 wherein the liquid is thermally deashed by heating the juice containing the calcium bicarbonate to form calcium carbonate precipitate.

3. A process according to claim 1 wherein the deashing comprises a liming step.

4. A process according to claim 1 wherein the sugar liquid is a cane sugar juice.

5. A process according to claim 1 wherein the sugar liquid is a beet sugar juice or a pineapple sugar juice.

6. A process according to claim 4 wherein the cane sugar juice has first been defecated with lime and the sugar juice is adjusted to a concentration in the range of about 10–25 Brix prior to treatment with the weak base resin in the bicarbonate form.

7. A process according to claim 4 wherein the juice, separated after the deashing stage, is then subjected to a further decolorizing step with at least one strong base anion exchange resin and is thereafter evaporated and crystallized to form a purified dry sugar product.

8. A process according to claim 1 wherein the metal cations which are exchanged with the calcium from the cation exchange resin are principally sodium and potassium ions.

9. A process according to claim 4 wherein the sugar juice also contains a small or minor amount of magnesium in the form of magnesium bicarbonate which upon heating is converted to insoluble magnesium hydroxide or insoluble magnesium oxide.

10. A process according to claim 4 wherein the juices are contacted with the weakly basic anion exchange resin at a temperature in the range of about 40°–65°C. and the exchange with cation exchange resin takes place at a temperature in the range of about 40°–65°C and at pressures of 3 – 6 atmospheres.

11. A process according to claim 2 wherein the thermal deashing takes place at a reduced pressure.

12. A process according to claim 2 wherein ammonia is used to regenerate the weak base resin, and the waste regenerant containing ammonium salts is thereafter reacted with lime to produce additional ammonium hydroxide which is used as the weak base regenerant in subsequent regeneration cycles.

13. A process according to claim 2, wherein the carbon dioxide evolved during the thermal deashing stage is used to convert the weak base resin to the bicarbonate form.

* * * * *